(12) United States Patent
Kim

(10) Patent No.: US 10,553,851 B2
(45) Date of Patent: Feb. 4, 2020

(54) PROTECTION APPARATUS FOR RECHARGEABLE BATTERY

(71) Applicant: SAMSUNG SDI CO., LTD., Yongin-si, Gyeonggi-do (KR)

(72) Inventor: Duk-Jung Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 330 days.

(21) Appl. No.: 15/407,773

(22) Filed: Jan. 17, 2017

(65) Prior Publication Data

US 2018/0062150 A1 Mar. 1, 2018

(30) Foreign Application Priority Data

Aug. 23, 2016 (KR) .................. 10-2016-0107111

(51) Int. Cl.
*H01M 10/04* (2006.01)
*H01M 2/34* (2006.01)
*H01M 10/42* (2006.01)

(52) U.S. Cl.
CPC ......... *H01M 2/348* (2013.01); *H01M 10/425* (2013.01); *H01M 2010/4271* (2013.01); *H01M 2200/103* (2013.01); *H01M 2220/20* (2013.01)

(58) Field of Classification Search
None
See application file for complete search history.

(56) References Cited

U.S. PATENT DOCUMENTS 8,355,233 B2 * 1/2013 Schumacher ............. B60L 3/04
361/114
9,331,325 B2 * 5/2016 Lim ........................ H01M 2/34

FOREIGN PATENT DOCUMENTS

KR 10-0834009 B1 6/2008
KR 10-2012-0069334 A 6/2012

* cited by examiner

*Primary Examiner* — Tracy M Dove
(74) *Attorney, Agent, or Firm* — Lee & Morse, P.C.

(57) ABSTRACT

A battery protecting apparatus includes a battery manager and a wake-up switch. The battery manager manages charge and discharge states of a battery pack and wakes up when external power is received. The wake-up switch supplies the external power to the battery manager when an internal temperature of the battery pack is equal to or greater than a predetermined reference temperature. The battery manager performs an emergency protection operation based on detection of the battery pack in a predetermined dangerous state at a time when the ignition switch is turned off and the wake-up switch is turned on.

15 Claims, 12 Drawing Sheets

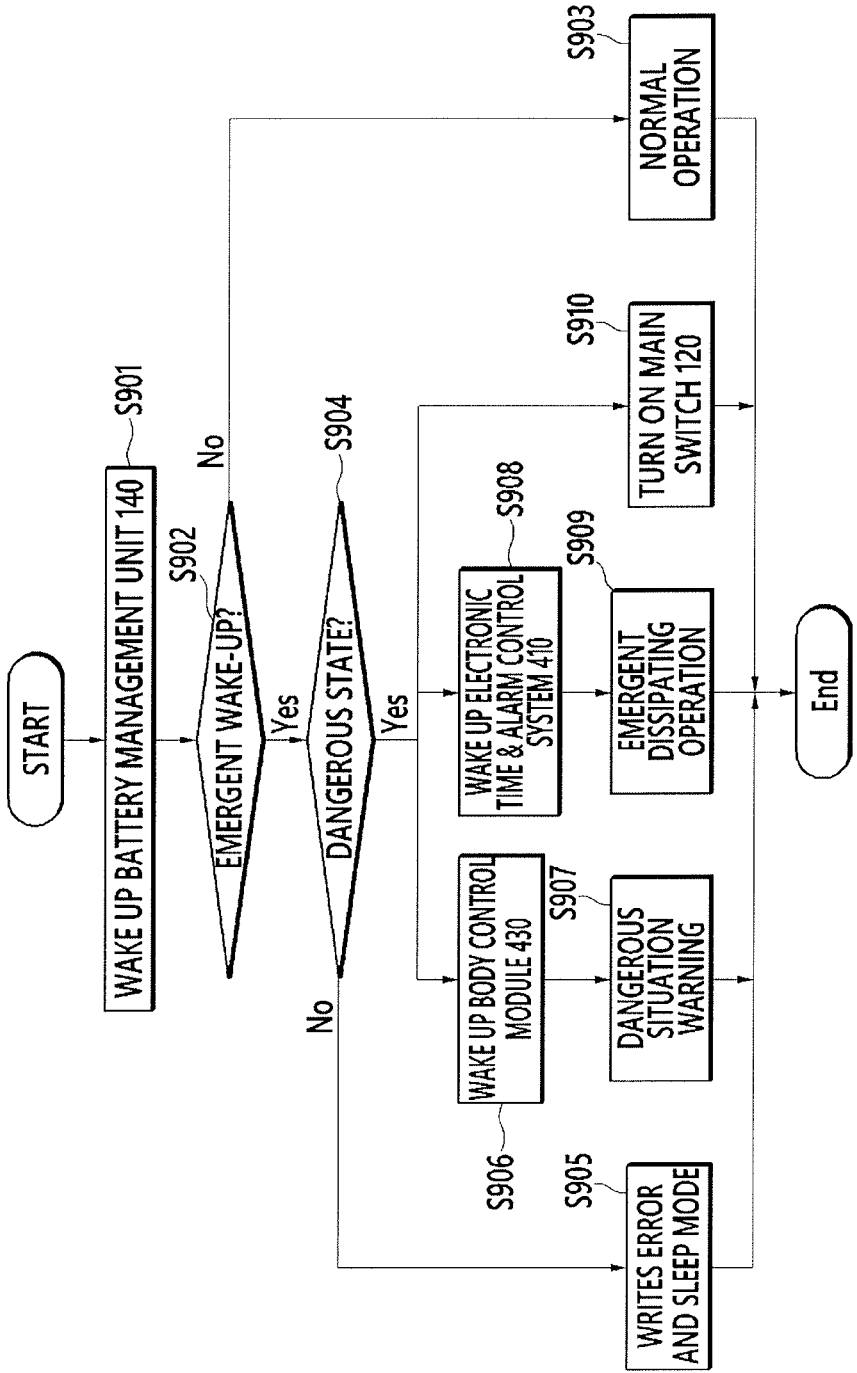

PROTECTION APPARATUS FOR RECHARGEABLE BATTERY

CROSS-REFERENCE TO RELATED APPLICATION

Korean Patent Application No. 10-2016-0107111, filed on Aug. 23, 2016, and entitled: "Protection Apparatus for Rechargeable Battery," is incorporated by reference herein in its entirety.

BACKGROUND

1. Field

One or more embodiments described herein relate to a protection apparatus for a rechargeable battery.

2. Description of the Related Art

A variety of rechargeable batteries have been developed. Examples include nickel-hydrogen (Ni-MH) batteries and lithium (Li) ion batteries. Low-capacity rechargeable batteries power mobile phones, laptop computers, camcorders, and other small portable electronic devices. Large-capacity rechargeable batteries power motors of hybrid and electric vehicles.

An electric vehicle may include a protection device (e.g., a fuse) for actively or passively blocking a connection between a high voltage circuit and the battery or for electrically insulating the battery to prevent fire or electric shock. Another type of protection device includes a control circuit to prevent heat emission caused by an overcharge condition of the rechargeable battery.

In some cases, it is difficult to perform active or passive control depending, for example, on the usage environment or battery state. When control is not properly performed, a fire may result.

SUMMARY

In accordance with one or more embodiments, a battery protecting apparatus includes a battery manager to wake up when external power is received, the battery manager to manage a charge state and discharge state of a battery pack; and a wake-up switch to supply the external power to the battery manager when an internal temperature of the battery pack is equal to or greater than a predetermined reference temperature, wherein the battery manager is to perform an emergency protection operation based on detection of the battery pack in a predetermined dangerous state at a time when the ignition switch is turned off and the wake-up switch is turned on.

The wake-up switch may deform to form a wire for physically connecting an external power line to an internal power supply line when the internal temperature of the battery pack equal to or greater than the reference temperature, the internal power supply line may be connected to the battery manager, and the external power line may receive the external power. The wake-up switch may be connected in parallel with the ignition switch between the external power line and the internal power supply line.

The wake-up switch may include a first connector to accommodate the external power line and the internal power supply line; and a second connector inserted into the first connector, the second connector to connect the external power line with the internal power supply line when the internal temperature of the battery pack equal to or greater than the reference temperature. The second connector may include a shape memory area including a material having a shape that is to change depending on the internal temperature of the battery pack; a first connection terminal coupled to the external power input line; a second connection terminal coupled to the internal power supply input line; and a housing coupled to a case of the battery pack, wherein the first and second connection terminals are electrically connected to each other based on deformation of the shape memory area.

The wake-up switch may include a shape memory area on a circuit board in which the battery pack is mounted, the shape memory area including a material having a shape that is to change depending on the internal temperature of the battery pack; a first connecting wire electrically connected to the external power input line; and a second connecting wire electrically connected to the internal power supply input line, wherein the first and second connecting wires are electrically connected to each other based on deformation of the shape memory area.

The battery pack may include a battery including at least one unit cell; and a main switch and a main fuse on a high current path of the battery, and wherein the battery manager is to open the main fuse by turning on the main switch and is to transmit an emergency protection request signal to a vehicle controller when the battery pack is in the dangerous state. The vehicle controller may perform a heat dissipation operation to cool the battery pack and a warning operation to generate a warning of the dangerous state when the emergency protection request signal is received. The warning operation may include a user warning operation to transmit a message indicating the dangerous state to a vehicle management terminal and a vehicle warning operation to drive at least one of a warning light or an alarm of the vehicle.

In accordance with one or more other embodiments, a battery protecting apparatus for a vehicle includes a circuit and a battery manager; wherein the battery manager is to receive power based on control of the circuit when a battery of the vehicle is charging and an ignition switch of the vehicle is off and wherein the battery manager is to perform a protection operation when the battery is detected to be in a dangerous state. The circuit may be a connector. The connector may include a shape memory material to change shape based on a temperature of the battery. The connector may connect the battery manager to receive the power when the shape memory material has a first shape, and disconnect the battery manager from receiving power when the shape memory material has a second shape. The protection operation may include insulating the battery. The battery manager may output a signal to generate a warning about the dangerous state of the battery.

BRIEF DESCRIPTION OF THE DRAWINGS

Features will become apparent to those of skill in the art by describing in detail exemplary embodiments with reference to the attached drawings in which:

FIG. 9 illustrates an embodiment of a battery protecting method.

DETAILED DESCRIPTION

Figure 1:
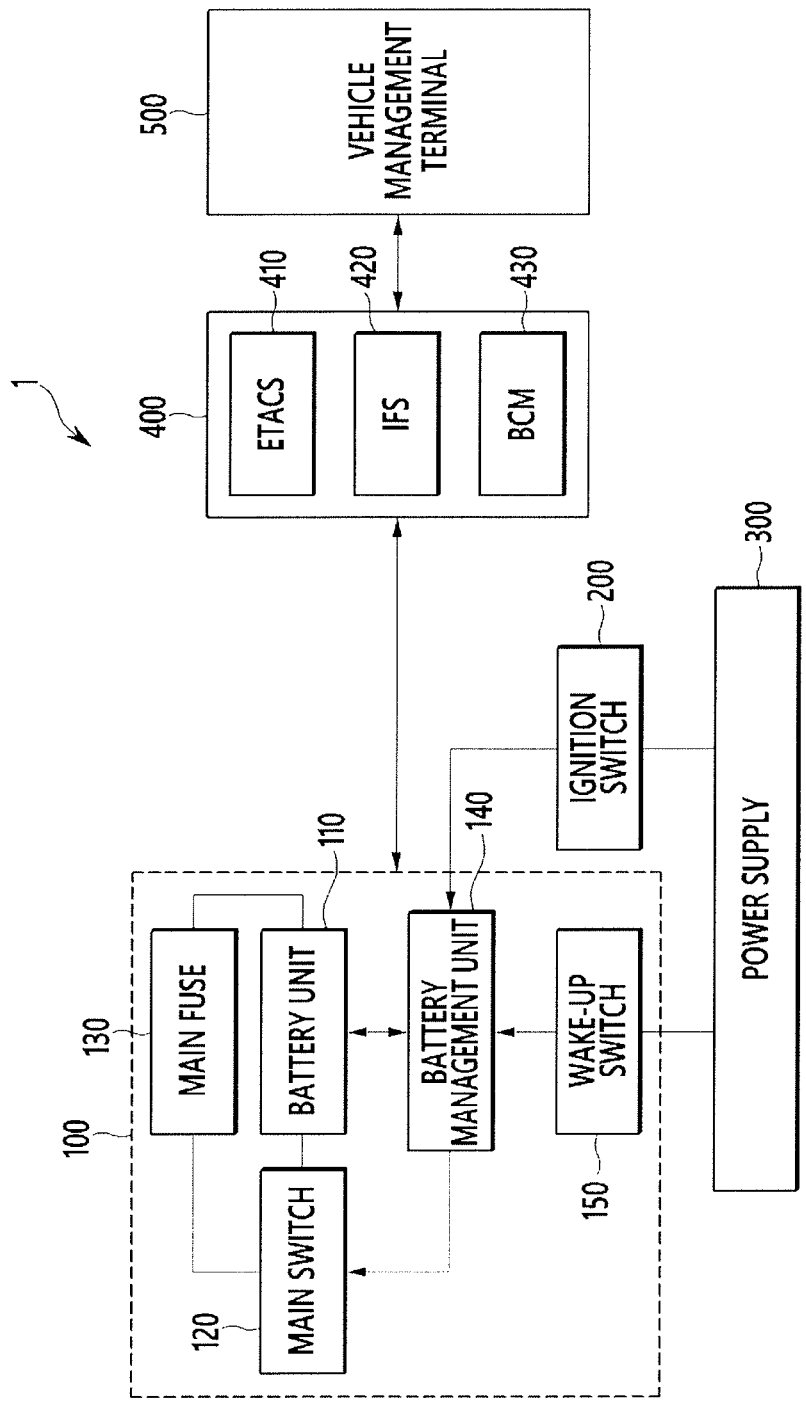
FIG. 1 illustrates an embodiment of a battery protecting apparatus.

Example embodiments will now be described with reference to the drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments (or portions thereof) may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates a battery protecting apparatus 1 which includes a battery pack 100, an ignition switch 200, a power supply 300, a vehicle control unit 400, and a vehicle management terminal 500. The battery pack 100 includes a battery unit 110, a main switch 120, a main fuse 130, a battery management unit 140, and a wake-up switch 150. The battery unit 110 includes a rechargeable battery that can be repeatedly charged and discharged. Examples of the rechargeable battery include but are not limited to a nickel-cadmium battery, a nickel metal hydride battery, a lithium-ion battery, and a lithium polymer battery. The battery unit 110 may include at least one battery module connected in series with a plurality of unit cells.

The battery management unit 140 manages the state of the battery pack 100. For example, the battery management unit 140 controls charge and discharge of the battery unit 110 by detecting a voltage, a current, a temperature, a state of charge (SOC), and/or a state of health (SOH) of the battery unit 110. The battery management unit 140 detects a dangerous state of the battery unit 110, e.g., overcharge, over-discharge, over-heat, or another condition. When a dangerous state is detected, the battery management unit 140 short-circuits the main fuse 130 by turning on the main switch 120, located on a high current path of the battery unit 110, to electrically insulate the battery unit 110.

The battery management unit 140 wakes up when external power is received from the power supply 300 through the ignition switch 200. When this power is received, the battery management unit 140 may enter normal mode. When supply of the external power is blocked, by turning off the ignition switch 200, the battery management unit 140 may enter a sleep mode, in which the battery is in an inactive state.

When heat is emitted (e.g., by electrical defects inside the battery pack 100 during stop or parking of a vehicle in which the ignition switch 200 is turned off), the battery management unit 140 may not control the main switch 120. As a result, fire may occur, which may harm the driver and other persons in the vehicle as well as things around the vehicle.

In order to prevent this from happening, the wake-up switch 150 is provided. The battery management unit 140 of the present embodiment wakes up by receiving external power through the wake-up switch 150, which is separate from the ignition switch 200, when an internal temperature of the battery pack 100 is equal to or greater than a predetermined reference temperature. The wake-up switch 150 forms a connection between the power supply 300 and the battery management unit 140 when the internal temperature of the battery pack 100 is equal to or greater than the reference temperature.

The battery management unit 140 transitions from a sleep mode to a normal mode when external power is received. When this occurs, the battery management unit 140 determines whether the current state of the battery pack 100 is in an emergent wake-up situation, and then determines whether the current state is a dangerous state of a predetermined condition in the case of the emergent wake-up situation. When the current state of the battery pack 100 is not a dangerous state, the battery management unit 140 writes the emergent wake-up situation as an error situation and returns to the sleep mode.

The dangerous state may include, for example, a condition in which a fire is likely occur as a result of heat emission from the battery pack 100. In one embodiment, the dangerous state may not indicate a state in which a problem of a short-circuit generated in the battery pack 100 is solved by disposing the main fuse 130 in a short-circuited conducting wire and opening the short-circuited conducting wire through the main fuse 130. Rather, in one embodiment, the dangerous state may include, for example, a state in which fire may occur as a result of a short-circuit of one unit cell or a short-circuit caused by non-mounted bolts or eliminated bus bars.

When the current state of the battery pack 100 is the dangerous state, the battery management unit 140 controls the main fuse 130 to be cut off by turning on the main switch 120. Then, the battery management unit 140 generates one or more signals, e.g., an emergency protection request signal including a protection operation request signal for delaying the dangerous state of the battery pack 100, a warning request signal for providing a warning about the dangerous state of the battery pack 100, and/or a wake-up signal for forcibly waking up the vehicle control unit 400. The signal is transferred to the vehicle control unit 400.

When the emergency protection request signal is received, the vehicle control unit 400 performs a protecting operation and a warning operation for the dangerous state of the battery pack 100. The vehicle control unit 400 may include an electronic time & alarm control system (ETACS) 410, an infotainment system (IFS) 420, and a body control module (BCM) 430.

Each of the electronic time & alarm control system 410, the infotainment system 420, and the body control module 430 may be changed from sleep mode to normal mode by a wake-up signal received from the battery management unit 140. The electronic time & alarm control system 410 may perform a control operation for dissipating heat from the battery pack 100 depending on the protection operation request signal. For example, the battery pack 100 may be cooled by cooling water or by a cooling fan.

The infotainment system 420 may transmit an emergency situation message to the vehicle management terminal 500 depending on the warning request signal (user warning operation). For example, the infotainment system 420 may transmit an emergency situation message to a user terminal of the vehicle or a terminal of an emergency service center within a predetermined radius based on a current position of the vehicle. The body control module 430 may report a dangerous situation to the driver or persons around the driver by operating an alarm or a lamp of the vehicle depending on the warning request signal (vehicle warning operation).

When the emergency protection request signal is received, the vehicle control unit 400 may recognize the dangerous state of the battery pack 100 and may delay the dangerous state of the battery pack 100 and/or warn the driver and persons around the driver about the dangerous state. A different way of performing the protecting operation and warning operation of the battery pack may be performed in another embodiment.

Figure 2A:
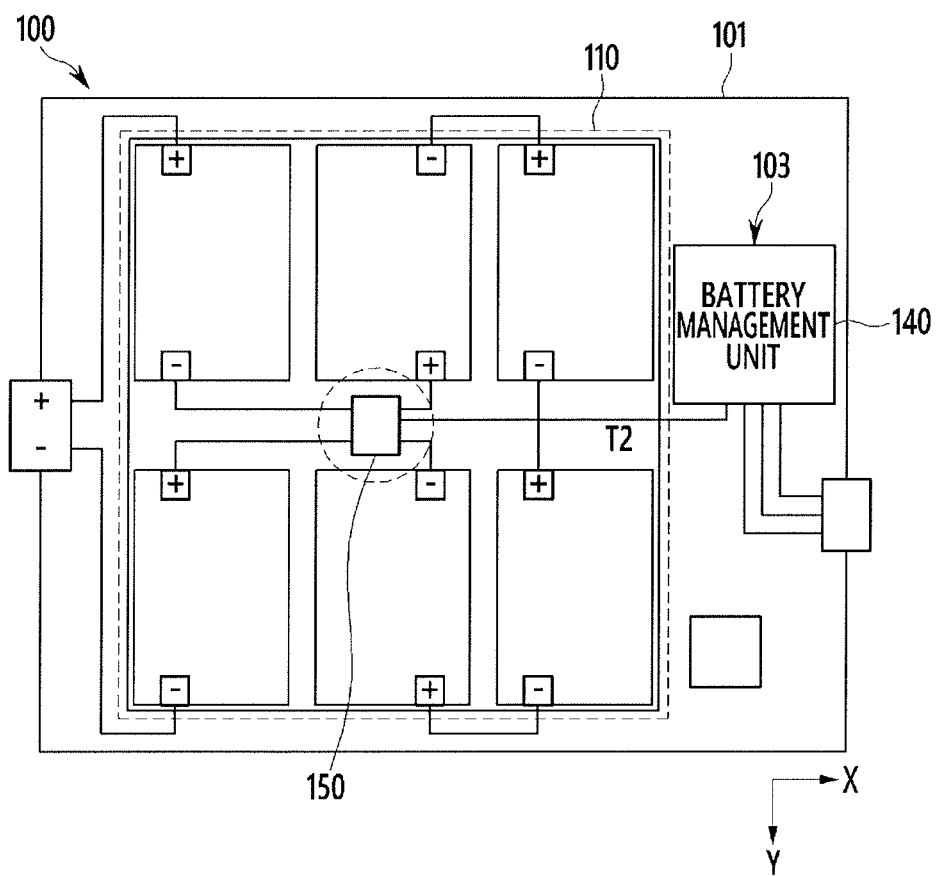
FIGS. 2A, 2B, and FIG. 3 illustrate an embodiment of a position and connection relationship of a wake-up switch.
Figure 2B:
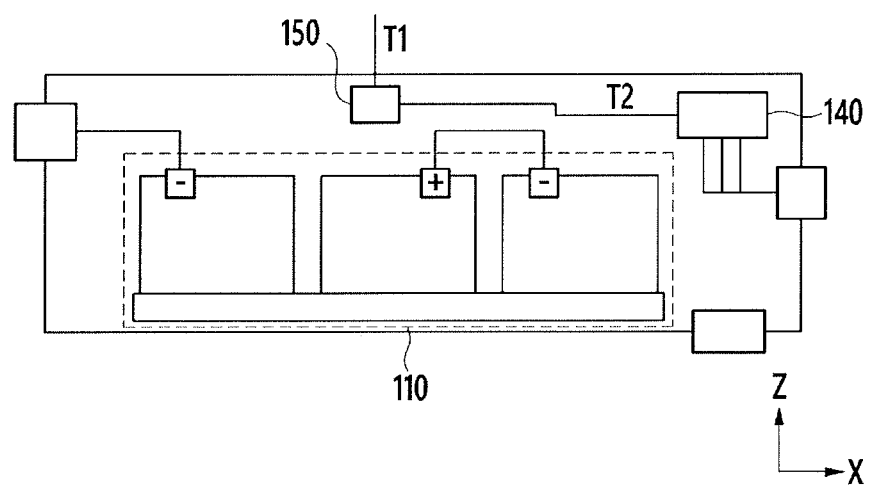
Figure 3:
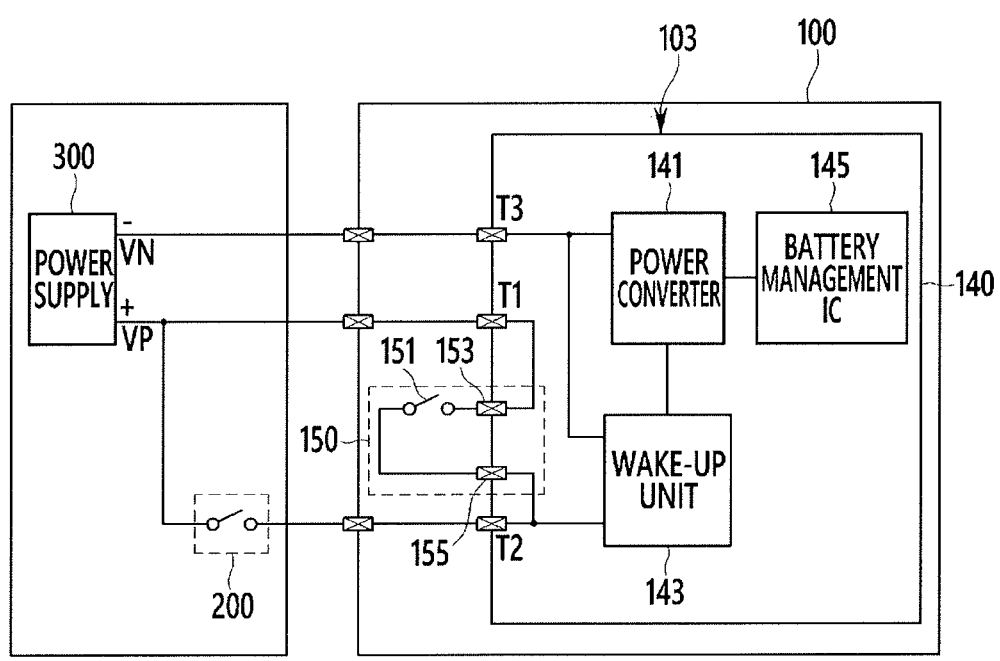

FIGS. 2A, 2B, and 3 illustrate an embodiment of a position and connection relationship of the wake-up switch 150. FIGS. 2A and 2B respectively illustrate front and side views of the battery pack 100.

Referring to FIGS. 2A and 2B, the wake-up switch 150 may be in an inner case 101 of the battery pack 100 and may be outside a circuit board 103 in which the battery management unit 140 is mounted. The wake-up switch 150 may be in a region in which internal heat of the battery pack 100 is focused The position of the wake-up switch 150 may be different in another embodiment depending for example, on the design of the battery pack 100.

Referring to FIG. 3, the wake-up switch 150 is connected in parallel with the ignition switch 200 between a first external power line T1 and an internal power supply line T2. The first external power supply line T1 receives a first external power VP. The first external power VP is input into the battery management unit 140 through the internal power supply line T2.

When an internal temperature of the battery pack 100 increases to be equal to or greater than a reference temperature, the wake-up switch 150 supplies the first external power VP to the battery management unit 140. When the internal temperature of the battery pack 100 increases to be equal to or greater than the reference temperature, the wake-up switch 150 also forms a wire for physically connecting the first external power line T1 and the internal power supply line T2.

The wake-up switch 150 includes a shape memory element 151 and first and second connection terminals 153 and 155. The shape memory element 151 has a shape that changes depending on the internal temperature. The first connection terminal 153 is connected to the first external power line T1 into which the first external power VP is input from the power supply 300. The second connection terminal 155 is connected to the internal power supply line T2.

A wake-up unit 143 receives first and second external power signals VP and VN, through the ignition switch 200 or the wake-up switch 150, and transfers them to a power converter 141. In this embodiment, T3 indicates a second external power line through which the second external power VN is input to the battery management unit 140. The power converter 141 converts the first and second external power signals VP and VN to operating powers and supplies them to a battery management IC 145 for operating circuits inside the battery management unit 140. The battery management IC 145 wakes up when the operating powers are received and enters the normal mode to perform a protecting operation and warning operation of the battery pack 100.

As a result, in the present embodiment, when the internal temperature of the battery pack 100 increases to be equal to or greater than the reference temperature in an off-state of the ignition switch 200, the battery management IC 145 wakes up when the first external power VP is sent to the wake-up unit 143 through the wake-up switch 150.

Figure 4:
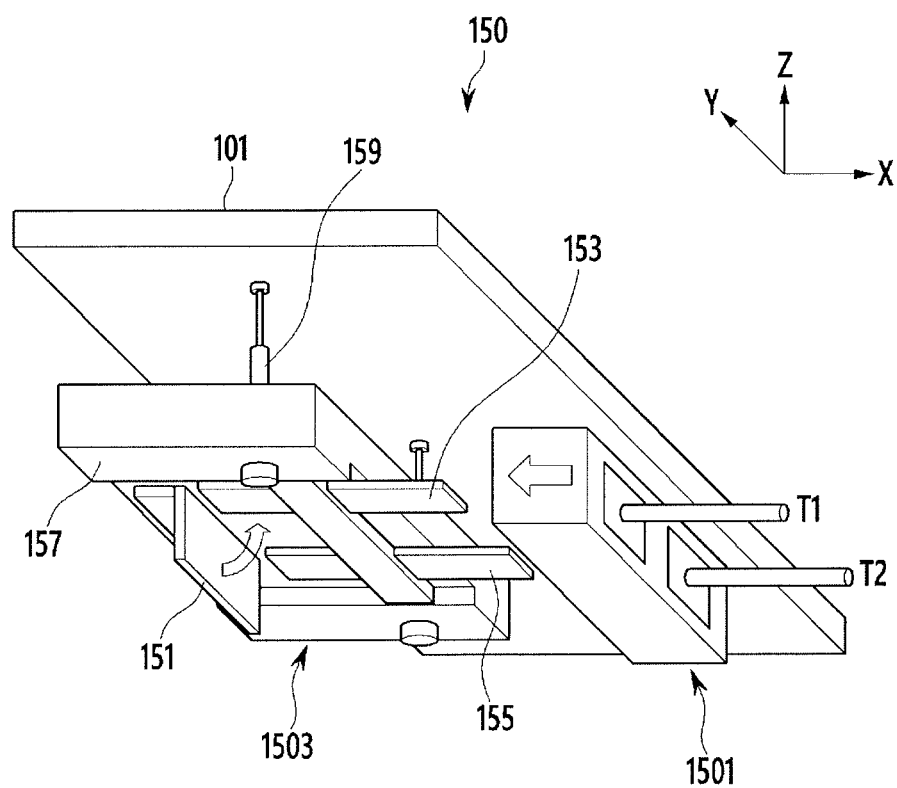
FIG. 4 illustrates an embodiment of a wake-up switch.
Figure 5A:
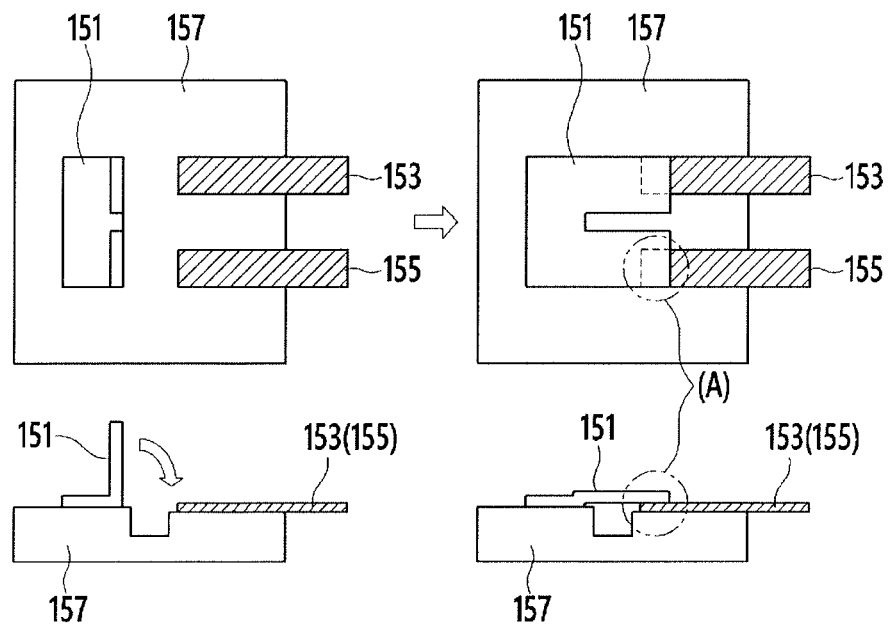
FIGS. 5A and 5B illustrate an embodiment for operating a wake-up switch.
Figure 5B:
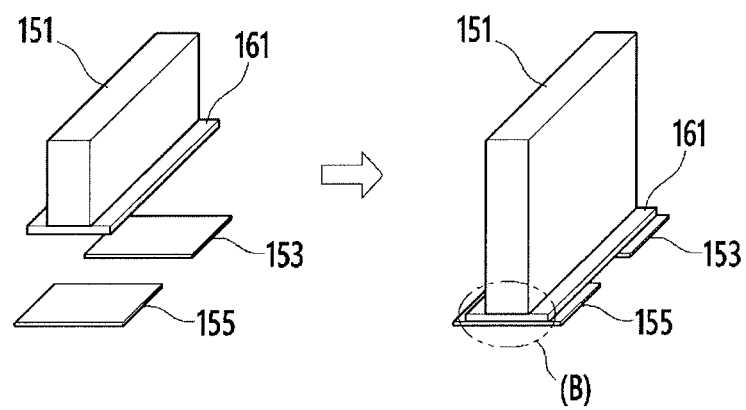

FIG. 4 illustrates an embodiment of the wake-up switch 150, and FIGS. 5A and 5B illustrate an embodiment for operating the wake-up switch 150. Referring to FIG. 4, according to the present exemplary embodiment, the wake-up switch 150 includes a first connector 1501 and a second connector 1503. The first connector 1501 accommodates the first external power input line T1 and the internal power supply line T2. The second connector 1503 is inserted into the first connector 1501 and fastened therein. The first external power input line T1 and the internal power supply line T2 are electrically connected to each other depending on the internal temperature of the battery pack 100.

The second connector 1503 includes the shape memory element 151, the first connection terminal 153, a second connection terminal 155, a housing member 157, and a fastening member 159. The shape memory element 151 is on the housing member 157 and is deformed into a shape that is memorized, depending on a temperature variation, to form a connection for electrically connecting the first connection terminal 153 and the second connection terminal 155. The shape memory element 151 may include, for example, a shape memory alloy (e.g., a nickel-titanium alloy, a copper-zinc alloy, a gold-cadmium alloy, or an indium-thallium (In—Tl) alloy) or a shape memory polymer such as polystyrene or polyurethane.

Referring to FIG. 5A, the shape memory element 151 may contact the first and second connection terminals 153 and 155 in hinge form. For example, when the shape memory element 151 is separated from the first and second connection terminals 153 and 155 by a predetermined interval and the internal temperature of the battery pack 100 increases to be equal to or greater than the reference temperature, the shape memory element 151 may deform in an arrow direction in region A to form an electrical connection for connecting the first and second connection terminals 153 and 155.

Referring to FIG. 5B, in another embodiment, the shape memory element 151 may contact the first and second connection terminals 153 and 155 in spring form. In this case, the wake-up switch 150 may include a third connection member 161 that is physically separated from the first and second connection terminals 153 and 155. The shape memory element 151 may be on the third connection member 161. The third connection member 161 may include a same metal as the first and second connection terminals 153 and 155.

When the internal temperature of the battery pack 100 increases to be equal to or greater than the reference temperature, the shape memory element 151 may deform in an arrow direction to allow the third connection member 161 to physically contact the first and second connection terminals 153 and 155 (as indicated in region B), and thus to form an electrical connection therebetween.

The first and second connection terminals 153 and 155 protrude toward the outside of the housing member 157 to physically fasten to the first external power input line T1 and internal power supply line T2, respectively. The first and second connection terminals 153 and 155 may include at least one metal, e.g., copper (Cu) wire plated with at least one of nickel, tin, and gold (Ni/Sn/Au). The housing member 157 may include, for example, plastic and may be coupled to the case 101 of the battery pack 100 through the fastening member 159.

Figure 6A:
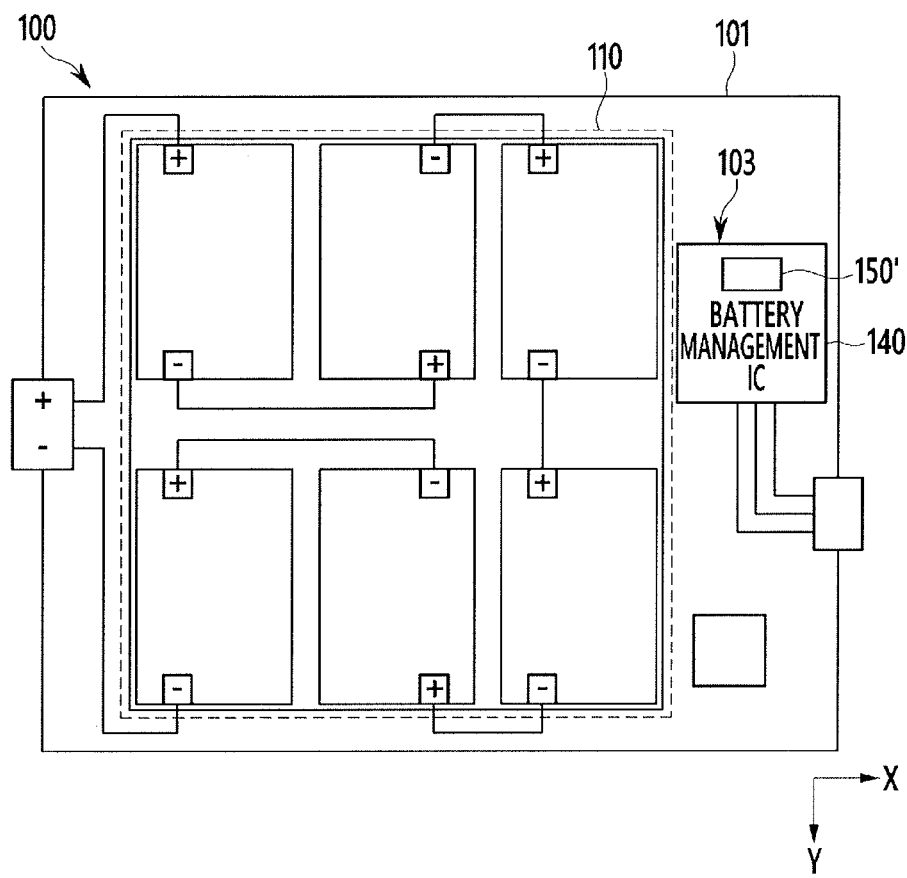
FIGS. 6A, 6B, and 7 illustrate another embodiment of a position and connection relationship of a wake-up switch.
Figure 6B:
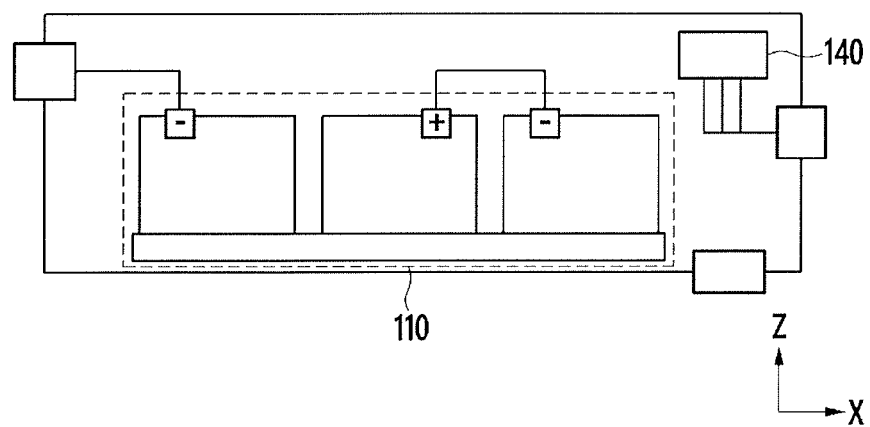
Figure 7:
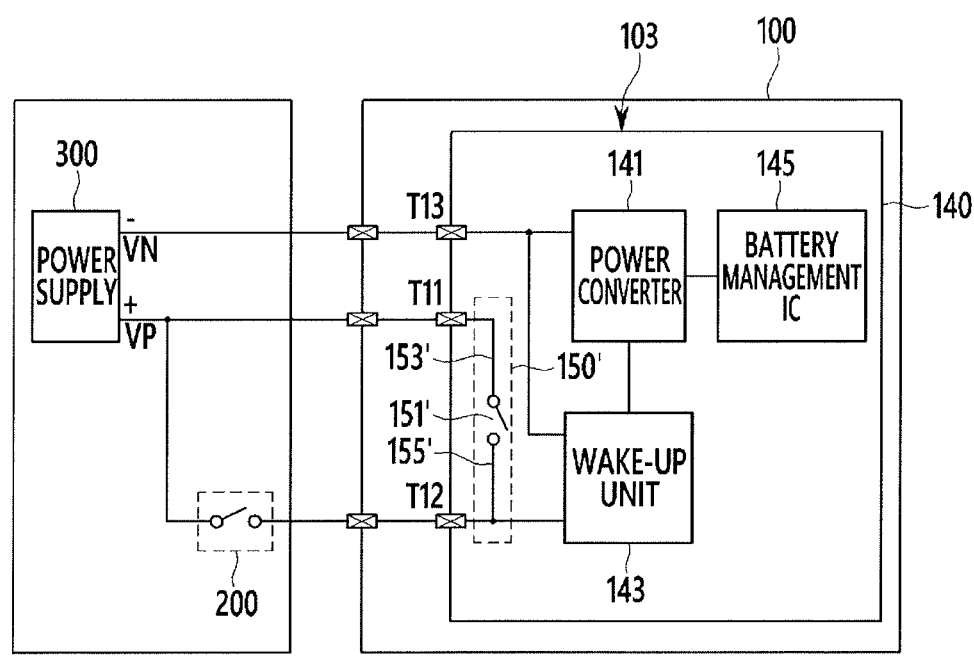

FIGS. 6A, 6B, and 7 illustrate another embodiment of a position and connection relationship of a wake-up switch 150'. FIGS. 6A and 6B respectively illustrate front and side views of the battery pack 100.

Referring to FIGS. 6A, 6B, and 7, the wake-up switch 150' according to the present exemplary embodiment is inside the circuit board 103 in which the battery management unit 140 is mounted. The power converter 141, a wake-up unit 143, and a battery management IC 145 in FIG. 7 may be the same as in FIG. 3.

The wake-up switch 150' is connected in parallel between the first external power line T11 and the internal power supply line T12. The wake-up switch 150' supplies the first external power VP to the battery management unit 140 when the internal temperature of the battery pack 100 increases to be equal to or greater than the reference temperature. The wake-up switch 150' forms a wire for physically connecting the first external power line T11 and the internal power supply line T12 when the internal temperature of the battery pack 100 increases to be equal to or greater than the reference temperature.

The wake-up switch 150 includes a shape memory element 151' on the circuit board 103 and first and second connection terminals 153' and 155'. The shape of the shape memory element 151' changes depending on the internal temperature of the battery pack 100. The first connecting wire 153' is connected to the first external power line T11 that receives the first external power VP from the power supply 300. The second connecting wire 155' is connected to the internal power supply input line T12. In this embodiment, the housing member 157 in FIG. 4 may not be provided and thus the structure of the present embodiment may be simplified.

Figure 8:
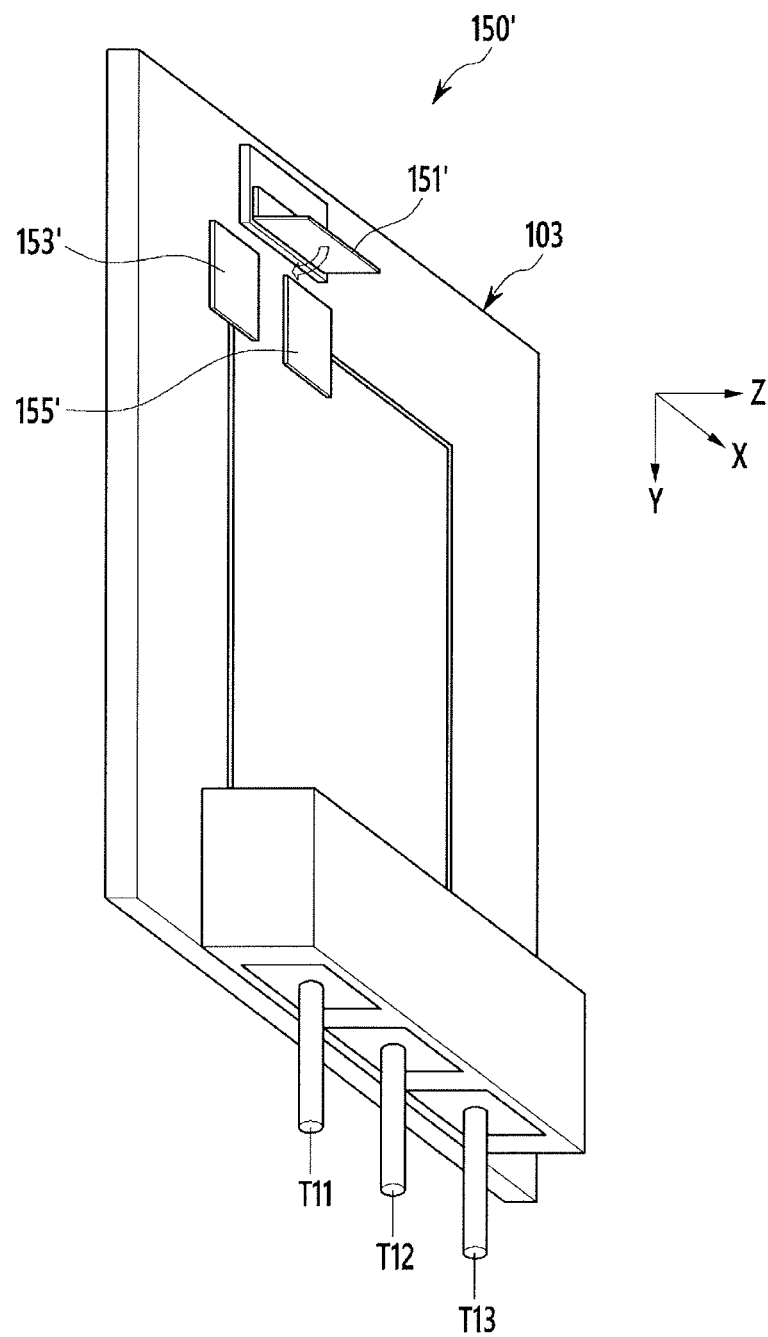
FIG. 8 illustrates another embodiment of a wake-up switch.

FIG. 8 illustrates an embodiment of the wake-up switch 150' which includes a shape memory element 151', a first connecting wire 153' and a second connecting wire 155'. The shape memory element 151' is on the circuit board 103 and separated from the first and second connection members 153' and 155' by a predetermined interval. The shape memory element 151' may be the same as the shape memory element 151 in FIGS. 3 and 4.

The first connection member 153' is connected to the first external power line T11. The second connecting wire 155' is connected to the internal power supply line T12 of the battery management unit 140. Reference numeral T13 indicates a second external power input line. When the shape memory element 151' is deformed, the first and second connection members 153' and 155' are electrically connected to the first external power input line T11 and the internal power supply line T12, respectively.

FIG. 9 illustrates an embodiment of a battery protecting method. Initially, the battery management unit 140 is in sleep mode. The method includes waking up the battery management unit 140 to transition from the sleep mode to normal mode (S901). Then, the battery management unit 140 determines whether an emergent wake-up situation exists by the wake-up switch 150 (S902). When an emergent wake-up situation does not exist, the battery management unit 140 performs a normal operation (S903).

When an emergent wake-up situation exists, the battery management unit 140 detects the temperature of the battery pack 100 to determine whether the current state is a dangerous state (S904). When the current state is not a dangerous state, the battery management unit 140 writes the emergent wake-up situation as an error situation and returns to the sleep mode (S905).

When the current state is a dangerous state, the battery management unit 140 transmits an emergency protection request signal to the vehicle control unit 300. For example, battery management unit 140 wakes up the body control module 430 (S906). The body control module 430 then warns the driver and persons around the driver about the dangerous state, for example, by operating a vehicle alarm and/or lamp (S907).

Further, the battery management unit 140 wakes up the electronic time & alarm control system 410 (S908), and performs an emergency heat dissipation operation of the battery pack 100 (S909). Then, the battery management unit 140 controls the main fuse 130 to be cut off by turning on the main switch 120 (S910).

With these operations, even while a vehicle is stopped or is parked with the ignition switch 200 of the vehicle turned off, it is possible to prevent damage to a person by warning the driver and persons around the driver about the dangerous situation. It is also possible to secure an evacuation time by delaying a fire generating time of the battery pack 100.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

The battery management units, controllers, modules, and other processing features of the embodiments described herein may be implemented in logic which, for example, may include hardware, software, or both. When implemented at least partially in hardware, the battery management unit, controllers, modules, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the battery management unit, controllers, modules, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery protecting apparatus, comprising:
a battery manager to wake up when external power is received, the battery manager to manage a charge state and discharge state of a battery pack; and
a wake-up switch to perform an on and off operation according to an internal temperature of the battery pack, the wake-up switch to be turned on to supply the external power to the battery manager when the internal temperature of the battery pack is equal to or greater than a predetermined reference temperature, wherein:
the wake-up switch includes a shape memory element including a shape memory alloy or a shape memory polymer, the shape memory element having a property that a shape of the shape memory element is changeable from an non-deformed shape to a deformed state when the internal temperature of the battery pack is equal to or greater than the predetermined reference temperature, the shape memory element being located in the wake-up switch such that an external power line is not connected to the battery manager when the shape memory element is in the non-deformed shape and such that the shape memory element physically connects the external power line to the battery manager when the shape memory element is in the deformed state, and
the battery manager is to perform an emergency protection operation based on detection of the battery pack in a predetermined dangerous state at a time when an ignition switch is turned off and the wake-up switch is turned on.

2. The battery protecting apparatus as claimed in claim 1, wherein:
the wake-up switch in the deformed state of the shape memory element forms a wire for physically connecting the external power line to an internal power supply line when the internal temperature of the battery pack equal to or greater than the predetermined reference temperature,
the internal power supply line is connected to the battery manager, and
the external power line receives the external power.

3. The battery protecting apparatus as claimed in claim 2, wherein the wake-up switch is connected in parallel with the ignition switch between the external power line and the internal power supply line.

4. The battery protecting apparatus as claimed in claim 2, wherein the wake-up switch includes:
a first connector to accommodate the external power line and the internal power supply line; and
a second connector inserted into the first connector, the second connector to connect the external power line with the internal power supply line in the deformed state of the shape memory element.

5. The battery protecting apparatus as claimed in claim 4, wherein the second connector includes:
a shape memory area including the shape memory element;
a first connection terminal coupled to the external power line;
a second connection terminal coupled to the internal power supply line; and
a housing coupled to a case of the battery pack, wherein the first and second connection terminals are electrically connected to each other based on deformation of the shape memory element.

6. The battery protecting apparatus as claimed in claim 2, wherein the wake-up switch includes:
a shape memory area on a circuit board in which the battery pack is mounted, the shape memory area including the shape memory element;
a first connecting wire electrically connected to the external power line; and
a second connecting wire electrically connected to the internal power supply line, wherein the first and second connecting wires are electrically connected to each other based on deformation of the shape memory element.

7. The battery protecting apparatus as claimed in claim 1, wherein the battery pack includes:
a battery including at least one unit cell; and
a main switch and a main fuse on a high current path of the battery, and
wherein the battery manager is to open the main fuse by turning on the main switch and is to transmit an emergency protection request signal to a vehicle controller when the battery pack is in the predetermined dangerous state.

8. The battery protecting apparatus as claimed in claim 7, wherein the vehicle controller is to perform a heat dissipation operation to cool the battery pack and a warning operation to generate a warning of the predetermined dangerous state when the emergency protection request signal is received.

9. The battery protecting apparatus as claimed in claim 8, wherein the warning operation includes a user warning operation to transmit a message indicating the predetermined dangerous state to a vehicle management terminal and a vehicle warning operation to drive at least one of a warning light or an alarm of a vehicle having the vehicle controller.

10. A battery protecting apparatus for a vehicle, comprising:
a circuit including a connector; and
a battery manager,
wherein the battery manager is to receive power based on control of the circuit when a battery of the vehicle is charging and an ignition switch of the vehicle is off, and perform a protection operation when the battery is detected to be in a dangerous state, and wherein:
the connector performs an on and off operation according to an internal temperature of the battery, and
the connector includes a shape memory element including a shape memory alloy or a shape memory polymer, the shape memory element having a property that a shape of the shape memory element is changeable from an non-deformed shape to a deformed state when the internal temperature of the battery is equal to or greater than a predetermined reference temperature, the shape memory element being located in the circuit such that an external power line is not connected to the battery manager when the shape memory element is in the non-deformed shape and such that the shape memory element physically connects the external power line to the battery manager when the shape memory element is in the deformed state.

11. The apparatus as claimed in claim 10, wherein the connector is to:
  connect the battery manager to receive the power when the shape memory element has the deformed state, and
  disconnect the battery manager from receiving power when the shape memory element has the non-deformed shape.

12. The apparatus as claimed in claim 10, wherein the protection operation includes insulating the battery.

13. The apparatus as claimed in claim 10, wherein the battery manager is to output a signal to generate a warning about the dangerous state of the battery.

14. The battery protecting apparatus as claimed in claim 1, wherein the wake-up switch is turned off to cut off the external power from the battery pack when the internal temperature of the battery pack is less than the predetermined reference temperature.

15. The battery protecting apparatus as claimed in claim 1, wherein the wake-up switch independently performs the on and off operation according to the internal temperature of the battery pack.

* * * * *